Patented Mar. 2, 1954

2,671,033

UNITED STATES PATENT OFFICE 2,671,033

COLORED GLASS FIBER PRODUCTS AND METHODS OF PRODUCING THEM

Jack H. Waggoner, Newark, Ohio, assignor to Owens-Corning Fiberglas Corporation, a corporation of Delaware No Drawing. Application March 15, 1952, Serial No. 276,869

17 Claims. (Cl. 117—65)

This invention relates to glass fiber products and more particularly to colored glass fibers and fabrics produced therefrom and to methods for producing the same.

Full utilization of glass fibers in textile fabrics and related structures has not been realized and may not be realized until suitable means are provided for permanently coloring glass in a practical manner independently of the melt from which the fibers are formed. Many of the difficulties in coloring glass fibers stem from the perfectly smooth surfaces developed on the fiber in forming. Such smooth and inert surfaces provide little onto which coloring material may anchor to resist removal by forces incident to normal handling.

Present techniques make use of resinous materials which are adherent to glass fiber surfaces under normal conditions, which materials might function as receptive bases for coloring substances. Such systems suffer, however, from the fact that the bond between the resinous material and the glass fiber surfaces is markedly weakened in the presence of high humidity or upon direct contact with water. This loss in bond strength apparently results from the presence of an intervening moisture layer which preferentially forms on the hydrophilic glass fiber surfaces and its effect is especially apparent under high humidity conditions. Thus both physical and chemical forces, inherent in natural glass fibers, are unfavorable to the employment of the techniques now used in the textile trade for coloring or printing on fabrics formed of natural fibers such as wool, silk, linen, or synthetic organic fibers of the type rayon, nylon, Vinyon, etc.

It is an object of this invention to produce glass fibers which may be given a permanent color in an economical and practical manner and to provide a method for manufacturing the same.

Another object is to produce colorable glass fibers without interfering with other desirable characteristics of the fiber or fabrics produced therefrom and it is a related object to produce colorable glass fibers having in combination one or more improved properties, such as better hand and feel, draping qualities characteristic of the finest silks and woolens, increased abrasion resistance, resistance to slippage of the weave, and reduced sheen or luster.

A further object is to provide the glass fiber surfaces with a color receptive base formed by the thermal treatment of colloidal metal oxides on the glass fiber surfaces and which, in addition, functions on the glass fiber surfaces as a bulking agent, anti-slip agent, and as a delustering agent.

A further object is to provide glass fibers with an inorganic base characterized by a high affinity for the glass fiber surfaces developed through chemical or physical bond responsive to heat treatment, which base is receptive to organic dyes to permit coloring by techniques commonly employed in the textile trade.

In carrying out this invention, glass fibers arranged in strand or fabric form are treated with an organo metallic compound capable of producing a colorless or relatively white reaction product upon decomposition at high temperature on the glass fiber surfaces whereafter the surfaces become highly receptive to conventional coloring agents or are able permanently to be colored by conventional means with ordinary coloring materials, such as pigments and dyes.

It appears that the thermal treatment of the glass fibers with organo metallic compounds or salts of the type which will hereinafter be described causes elimination of organic or non-metallic components to form a reaction product which may comprise the oxides of the corresponding metal but probably is more accurately defined as a thermal reaction product of the organo metallic compound with groupings that exist on the glass fiber surfaces. The thermal reaction product appears to become a part of the glass fiber surfaces whether by orientation or combination, permanently to modify the surfaces whereby they become more highly receptive to coloring agents and without impairing the many other desirable characteristics of the glass fibers. The reaction product, which appears to be colloidal in form, is in such excellent distribution as to give the appearance of a continuous film that forms an integral part of the glass fiber surface.

Treatment to form the colorable base on glass fiber surfaces may be carried out with glass fibers of the staple type or of the continuous type. It may be achieved with yarns or fabrics formed of staple or continuous glass fibers or mixtures thereof. It may also be carried out with glass fibers in combination with other fibers capable of withstanding the rigorous conditions of heat treatment such as with asbestos. Treatment may be achieved conjointly with the fiber forming process or, preferably, by the treatment of the fibers subsequent to their formation, such as after the fibers have been processed into yarns or cloth. It may be carried out with fibers that have been sized during their manufacture with conventional materials, such as gelatin, starch, or organo silicon compounds. Treatment may be carried out with fibers from which the size has been removed by a water or solvent wash or by heat treatment. Thus coloring of glass fibers may be adapted to various coloring techniques such as roller printing or screen printing, processes which heretofore have been difficult to use with glass fiber fabrics.

Representative of the salts which may be used in carrying out my invention are the salts or compounds in which tin, zinc, aluminum, titanium and zirconium is a component. For example, I may use organic metallic salts of tin, such as stannic naphthenate, stannic resinate, stannic benzoate, stannic octate, stannic salts of other aliphatic and aromatic acids, and stannic salts or soaps of fatty acids of the type oleic acid, stearic acid, palmitic acid, and the like. The organo salts and soaps may be applied from solution in organic solvents of the type Stoddard solvent, benzene, naphtha, toluene, other coal tar solvents, esters, ketones, and the like. They may also be applied as emulsions or dispersions in aqueous or organic medium. It is best in many instances to employ a combination of salts and it is most expedient to make use of a soap in combination with a salt when the treating composition is in the form of an emulsion or dispersion. Use may also be made of the inorganic salts of the desired metallic components such as stannic chloride, stannic nitrate, or use may be made of salts in which the metallic component is constituted as a part of the anion such as sodium stannate, calcium titanite, zirconites, zincates, and the like. The alkali metal salts of this type are soluble in aqueous medium.

Proper concentration of reaction product on the glass fiber surfaces can be secured by the treatment of the fibers with a composition in which the salt or compound concentration ranges from 0.2–20 percent by weight. Best results are secured with concentrations of about 1–5 percent by weight. Complete penetration of the fiber bundles can be secured by application of the treating composition as a stable solution, and substantially complete and uniform coverage can be had by application from aqueous emulsion or dispersion, especially when a soap is present to aid wetting out of the fibers. Benefit of solvent solution and aqueous dilution can be readily secured by dissolving the organo salts in high concentration in solvent medium and then dilution by dispersion of the solvent solution in water. For instance, a 70 percent solution of tin naphthenate in toluene may be diluted to 1 percent concentration with water to provide an economical composition having the desired characteristics.

Responsive to thermal treatment, the salt having the metallic component is converted by thermal reaction in situ on the glass fiber surfaces to a color receptive reaction product. The maximum temperature for thermal reaction is limited by the temperature at which the fibers are fused together and preferably should be slightly below fusion temperature for the glass composition of which the fibers are formed. For most fibers the desired upper limit of operational temperature is between 1200 and 1250° F. The minimum temperature capable of use to achieve the desired effect is 600° F. or above. Between these temperatures, various time and temperature combinations may be used such as 3–5 minutes at 600° F. ranging to 2–5 seconds at 1250° F. Under the more severe temperature conditions, that is, between 900 and 1250° F., a certain amount of weave-setting is effected and the fibers become relaxed and weave-set when in yarn or fabric form and acquire a relaxed relation. Such fiber relaxation and weave-setting imparts new and improved characteristics to the textile material such as improved hand, feel, wrinkleproofness and suppleness desired for most textile or drapery materials. These characteristics are further improved if the heat treated fibers are subsequently provided with a lubricating and protective coating to minimize destructive effects resulting from mutual abrasion such as by the subsequent treatment with a polysiloxane, butadiene-acrylonitrile copolymer, polyvinyl acetate or the like coating and lubricating resinous materials.

Corresponding results may be secured by the use of other corresponding organic or inorganic salts having as the metal component, lead, zinc, barium, titanium, or other polyvalent metallic elements capable of forming substantially colorless reaction products. These may be also applied to the glass fibers as organic salts of naphthenic acid, fatty acids, resin acids, aromatic acids, benzoic acid, and the like, or as inorganic salts wherein they function as the cation or wherein they are constituted in the negative groupings of a metallic salt, such as the plumbates, arsenates, and the like.

Instead of applying the metal salt from liquid composition, deposition may be made by subjecting the fibrous fabric to vapors of a vaporizable inorganic metal salt generated from a hot melt in close vicinity to the fiber. The heat for vaporization will ordinarily be sufficient to effect the described thermal reaction to cause the desired molecular rearrangement on the glass fiber surfaces and produce the colloidal-like particles in the manner described. When carried out in a heating tower, the temperatures may be capable of causing a simultaneous weave-setting of the fiber. Representative of vaporizable salts are those composed of a polyvalent metal with an acid radical of the type chloride, bromide, iodide in which the metal may be represented by antimony, zinc, tin, lead, titanium, barium, and the like.

Dye coloring of the treated glass fibers may follow at any time. It may be carried out as a continuous operation with the treatment described to permit the production of colored fibers or fabrics as a commercial product. It may be achieved at the station of use before or after the fibers have been assembled into a usable product which is formed therefrom. It may be practiced by individuals by the use of package dyes designed for small batch or home use. Wherever consummated, the dyes appear to be substantially absorbed into the reaction product formed on the glass fiber surfaces or else the dye finds sufficient anchorage on such modified glass fiber surfaces to impart color of a permanent character. The bond or anchorage of the respective reaction products to the glass fibers is unaffected by water and is not disturbed by rubbing or abrasive forces. As a result the color on the glass fibers is of a permanent nature, unaffected by heat, light, atmosphere and is not subject to fading, crocking, or abrasion.

Coloring may be achieved by the usual techniques for dyeing and printing on textile materials as employed in the textile trade. Suitable dyes include methyl violet, Victoria blue, malachite green, brilliant green, rhodamine dyes, thioflavine dyes or acid dyes of the type nigrosine dye or induline dyes or lake-forming pigments, such as alizarine dyes, Lithol red, para red, toludine red, hansa yellow, ponsol blue, phthalocyanine dye, cyan blue, monastral blue, amaranth and the like. Suitable insoluble pigments which may be incorporated by aqueous dispersion or in suitable resinous carriers include cadmium red, chrome yellow, molybdate orange, Paris green, ultramarine blue, cobalt blue, carbon black, and various coloring metal oxides which will hereinafter be described.

In specific application, a strand of glass fibers is submerged in a 5 percent water solution of sodium stannate. The impregnated strand is then advanced through a furnace heated to 600–700° F., for about five minutes to convert the salt into a reaction product on the glass fiber surfaces which makes the surface highly receptive to conventional coloring substances applied by conventional means. The reaction product functions additionally as a lubricant to improve the resistance of the fibers to destructive abrasion, and they operate further as a bulking agent to separate the fibers one from another in a manner which is beneficial to the fibers in fabric form. They have the characteristics of reducing fiber slippage and, by control of salts deposited, delustering effects can be secured. The treated fabric having the reaction product formed on the surfaces thereof may be colored in a dye bath containing methyl violet in 5 percent solution or it may be colored green by a 20 percent dispersion of Paris green in aqueous medium.

As a further example, a textile woven of glass fibers having the ordinary size of gelatin and starch is heat treated at 600° F. for one to two minutes to burn off the size. Thereafter the fabric is advanced through a dip tank containing a composition formed by water dilution of a 60 percent solution of tin naphthenate in Stoddard solvent to a 2 percent salt concentration. After air drying, the treated fabric is heated for five seconds at 1200° F. to convert the stannic salt to the corresponding reaction product. The temperature employed also causes some weave-setting of the fibers to produce a fabric having better hand and flexibility.

Excellent results are secured when the fabric subsequent to heat treatment is further processed by the addition of a size or lubricant. These may include the ordinary starch, sugar, gelatin, oil, aliphatic amine and like materials, but excellent results are secured when the size or coating constitutes an organo-silicon compound, such as a silicon oil of the type dimethyl polysiloxane (DC 200 oil), diphenyl polysiloxane, diethyl polysiloxane (DC 400 oil), etc. The diluent for the size or lubricant may be removed by exposure to 250–400° F. for a short time, but best results are secured by a short bake at 600 to 800° F. to harden the organo-silicon and further to relax the fibers. The treated glass fibers or fabric may subsequently be dyed to desired colors by the usual methods employed in the textile trade.

Delustering, anti-slip and bulking agents may be formed on the glass fiber surfaces in relatively high concentration by the simple expedient of incorporation into the treating composition larger amounts of organo metallic salts or inorganic metal containing salts that yield a white flocculent or colloidal reaction product on the glass fiber surfaces at the temperature of heat treatment. Additions of as much as 20 percent colloidal silica and the like may be incorporated in the treating composition further to bulk up the fibers in the fabric. By the addition of zinc sulphate and the like, fluorescent characteristics may be imparted.

It will be understood that glass fibers in various forms having the reaction products or the colloidal-like particles deposited by thermal reaction on the glass fiber surfaces constitute an article of commerce and forms a part of this invention.

This application is a continuation-in-part of my copending application Serial No. 96,612, filed on June 1, 1949, now abandoned, entitled Colored Glass Fiber Products and Methods of Producting Them.

As used herein, the term "colorless" is intended to mean without colors such as red, blue, green, etc. as distinguished from white which functions as a background color capable of taking any of the more pronounced colors or tints.

It will be further understood that the invention is not limited to any specific amount of reaction product on the glass fiber surfaces, it being expedient, however, to maintain the concentration below that at which the fiber characteristics are harmfully affected. It will be further understood that numerous changes may be made in the combination of materials in the treating composition and their amounts, their method of application and heat treatment without departing from the spirit of the invention, especially as defined in the following claims.

I claim:

1. The method of treating glass fibers for improving anchorage of coloring agents comprising the steps of coating the glass fibers with a compound containing a salt having a metallic component selected from the group consisting of antimony, zinc, tin, lead, titanium and barium and which when heated to high temperature on the glass fiber surfaces gives a substantially white reaction product, and then heating the coated fibers to a temperature above 600° F. but below the fusion temperature for the glass composition of which the fibers are formed for a time sufficient to form the reaction product on the glass fiber surfaces.

2. The method of treating glass fibers to improve their receptivity for coloring agents comprising the steps of coating the glass fibers with an organo metallic compound having a metallic component selected from the group consisting of antimony, zinc, tin, lead, titanium and barium which when heated to high temperature on the glass fiber surfaces gives a substantially white reaction product, and then heating the coated fibers to a temperature above 600° F. but below the fusion temperature for the glass composition of which the fibers are formed for a few minutes at the lower temperature to a few seconds at the higher temperature.

3. The method of treating glass fibers to make them highly receptive to coloring agents comprising the steps of coating the glass fibers with an organo metallic compound having a metallic component selected from the group consisting of antimony, zinc, tin, lead, titanium and barium which when heated to high temperature on the glass fiber surfaces gives a substantially white reaction product and then heating the coated fibers under a time and temperature condition ranging from 2–5 minutes at 600° F. to a few seconds at 1250° F., coating the heat treated fibers with a polysiloxane and then heating the coated fibers at a temperature within the range of 600–850° F. to set the polysiloxane on the glass fiber surfaces.

4. The method of treating glass fibers to improve the bonding relation with coloring agents comprising the steps of coating the glass fibers with a composition containing 0.2–20 percent by weight of a salt having a metallic component selected from the group consisting of antimony, zinc, tin, lead, titanium and barium which when heated to high temperature on the glass fiber surfaces gives a substantially white reaction product, and then heating the coated fibers to a temperature above 600° F. but below the fusion temperature for the glass composition of which the fibers are formed for a time ranging from several minutes at the lower temperature to a few seconds at the higher temperature.

5. The method of treating glass fibers to improve the bonding relation with coloring agents comprising the steps of coating the glass fibers with a composition containing 0.2–20 percent by weight of an organo metallic compound having a metallic component selected from the group consisting of antimony, zinc, tin, lead, titanium and barium which when treated to high temperature gives a substantially white reaction product and then heating the coated fibers to a temperature above 600° F. but below the fusion temperature for the glass composition of which the fibers are formed for a time ranging from several minutes at the lower temperature to a few seconds at the higher temperature.

6. The method of treating glass fibers to make them more highly receptive to coloring agents comprising the steps of coating the glass fibers with a composition containing up to 20 percent by weight finely divided silica and 0.2–20 percent by weight of an organo metallic compound having a metallic component selected from the group consisting of antimony, zinc, tin, lead, titanium and barium which when heated to high temperature gives a substantially white reaction product, and then heating the coated fibers to a temperature above 600° F. but below the fusion temperature for the glass composition of which the fibers are formed for a time ranging from several minutes at the lower temperature to a few seconds at the higher temperature.

7. The method of treating glass fibers to make them more highly receptive to coloring agents comprising the steps of coating the glass fibers with a composition containing up to 20 percent by weight finely divided silica and 0.2–20 percent by weight of an organo metallic compound having a metallic component selected from the group consisting of antimony, zinc, tin, lead, titanium and barium which when heated to high temperature gives a substantially white reaction product, and then heating the coated fibers to a temperature above 600° F. but below the fusion temperature for the glass composition of which the fibers are formed for a time ranging from several minutes at the lower temperature to a few seconds at the higher temperature, coating the heat treated fibers with a polysiloxane and then heating the coated fibers at a temperature within the range of 600–850° F. to set the polysiloxane on the glass fiber surfaces.

8. The method of treating glass fibers to improve the bonding relation with coloring agents comprising the steps of coating the glass fibers with a composition containing 0.2–20 percent by weight of a salt having a metallic component selected from the group consisting of antimony, zinc, tin, lead, titanium and barium which when heated to high temperature on the glass fiber surfaces gives a substantially white reaction product, and then heating the coated fibers to a temperature above 600° F. but below the fusion temperature for the glass composition of which the fibers are formed for a time ranging from several minutes at the lower temperature to a few seconds at the higher temperature, coating the heat treated fibers with a polysiloxane and then heating the coated fibers at a temperature within the range of 600–850° F. to set the polysiloxane on the glass fiber surfaces.

9. The method of coloring glass fibers comprising the steps of coating the glass fibers with a composition containing 0.2–20 percent by weight of a salt having a metallic component selected from the group consisting of antimony, zinc, tin, lead, titanium and barium which when heated to high temperature on the glass fiber surfaces gives a substantially white reaction product, heating the coated fibers to a temperature above 600° F. but below the fusion temperature for the glass composition of which the fibers are formed for a time within the range of several minutes at the lower temperature to a few seconds at the higher, and then coating the glass fibers with a composition containing a coloring agent.

10. The method of coloring glass fibers comprising the steps of coating the glass fibers with a composition containing 0.2–20 percent by weight of an organo metallic compound having a metallic component selected from the group consisting of antimony, zinc, tin, lead, titanium and barium which when heated to high temperature on the glass fiber surfaces gives a substantially white reaction product, and then heating the coated fibers to a temperature above 600° F. but slightly below the fusion temperature for the glass composition of which the fibers are formed for a time within the range of several minutes at the lower temperature to a few seconds at the higher, and then coating the glass fibers with a composition containing a coloring agent.

11. The method of coloring glass fibers comprising the steps of coating the glass fibers with a composition containing 0.2–20 percent by weight of a salt having a metallic component selected from the group consisting of antimony, zinc, tin, lead, titanium and barium which when heated to high temperature on the glass fiber surfaces gives a substantially white reaction product, then heating the coated fibers to a temperature above 600° F. but slightly below the fusion temperature for the glass composition of which the fibers are formed for a time within the range of several minutes at the lower temperature to a few seconds at the higher, and then coating the glass fibers with a composition containing a coloring agent, coating the heat treated fibers with a polysiloxane and then heating the coated fibers at a temperature within the range of 600–850° F. to set the polysiloxane on the glass fiber surfaces.

12. The method of coloring glass fibers comprising the steps of coating the glass fibers with a composition containing up to 20 percent by weight of finely divided silica and 0.2–20 percent by weight of an organo metallic compound having a metallic component selected from the group consisting of antimony, zinc, tin, lead, titanium and barium which when heated to high temperature on the glass fiber surfaces gives a substantially white reaction product, subjecting the coated fibers to temperature and time conditions ranging from 2–5 minutes at 600° F. to a few seconds at 1250° F. to form the reaction product on the glass fiber surfaces, and then coating the glass fibers with a composition containing a coloring agent.

13. Glass fibers which are highly receptive to coloring material formed by the method of claim 1.

14. Glass fibers which are highly receptive to coloring material formed by the method of claim 6.

15. Glass fibers which are highly receptive to coloring material formed by the method of claim 8.

16. Glass fibers which are highly receptive to coloring material formed by the method of claim 9.

17. Glass fibers which are highly receptive to coloring material formed by the method of claim 11.

JACK H. WAGGONER.

References Cited in the file of this patent

UNITED STATES PATENTS

| Number | Name | Date |
|---|---|---|
| 2,436,304 | Johannson | Feb. 17, 1948 |
| 2,563,288 | Steinman | Aug. 7, 1951 |
| 2,584,763 | Waggoner | Feb. 5, 1952 |
| 2,593,817 | Waggoner | Apr. 22, 1952 |
| 2,608,499 | Straka | Aug. 26, 1952 |

FOREIGN PATENTS

| Number | Country | Date |
|---|---|---|
| 559,068 | Great Britain | Feb. 2, 1944 |